March 28, 1950 L. T. BARRICKMAN 2,501,652
METHOD OF AND APPARATUS FOR STUFFING
OIL FILTER ELEMENTS
Filed March 27, 1946 2 Sheets-Sheet 1
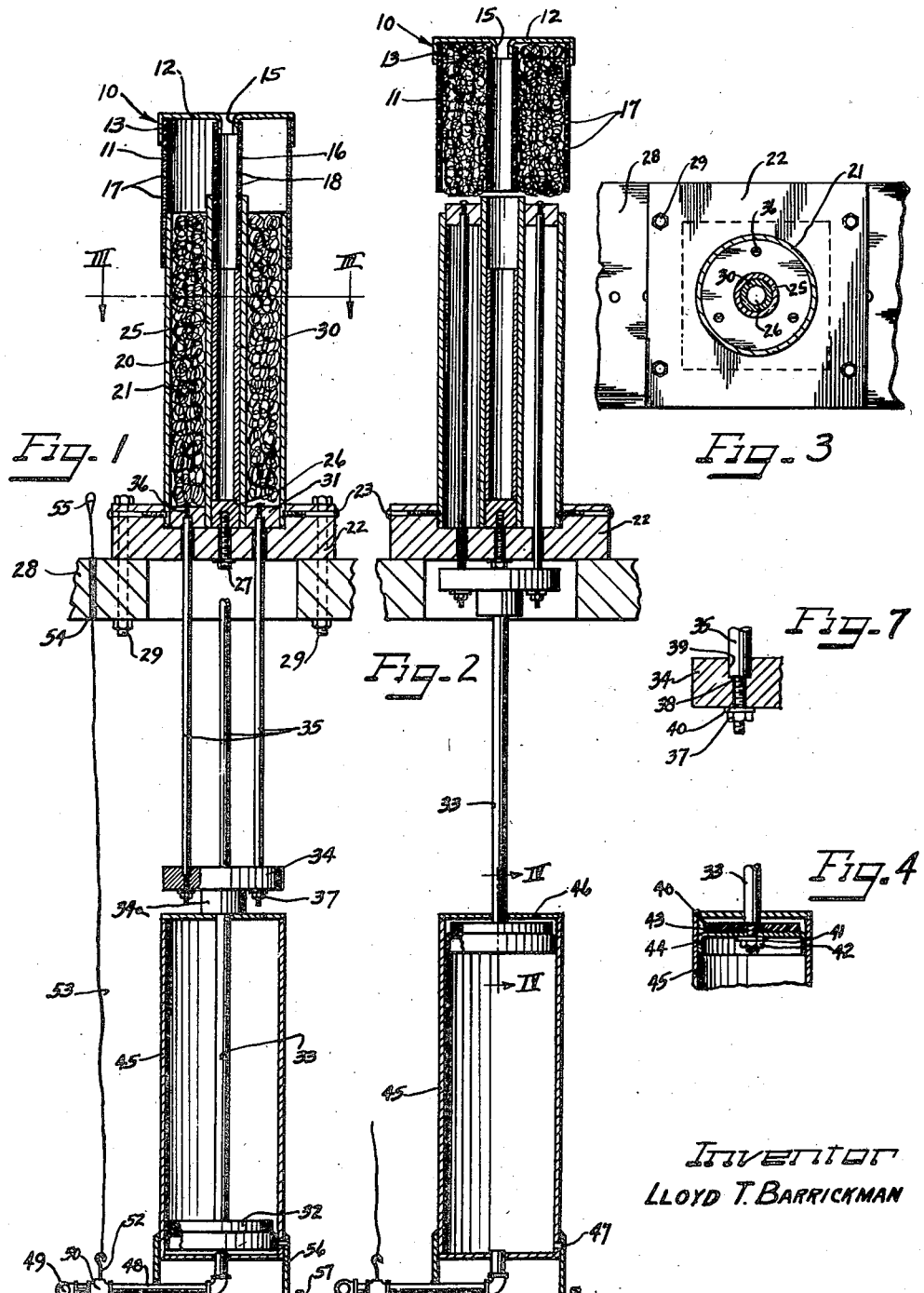
Inventor
LLOYD T. BARRICKMAN March 28, 1950
L. T. BARRICKMAN
2,501,652
METHOD OF AND APPARATUS FOR STUFFING
OIL FILTER ELEMENTS
Filed March 27, 1946
2 Sheets-Sheet 2
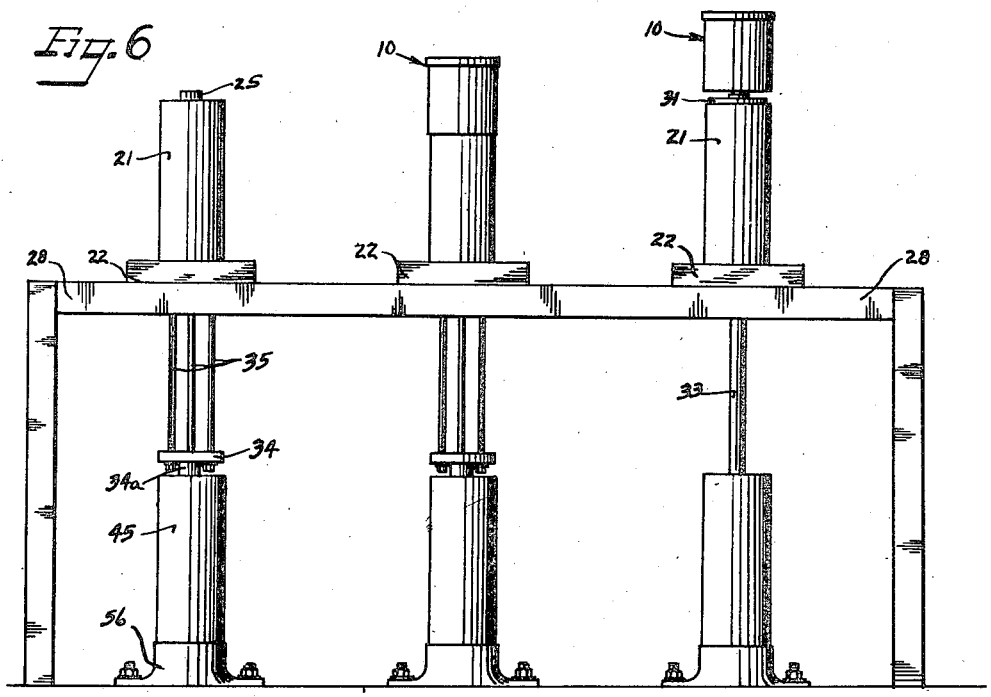
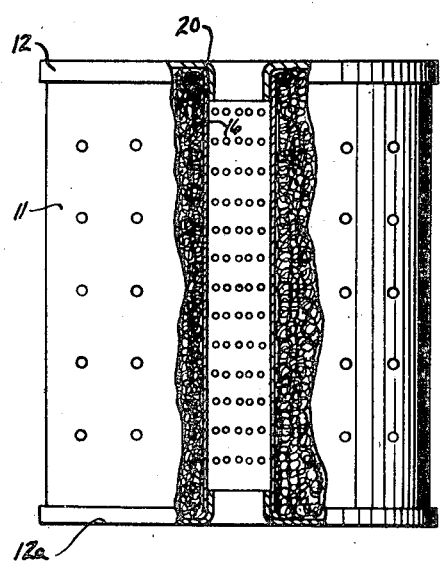
Inventor
LLOYD T. BARRICKMAN Patented Mar. 28, 1950

2,501,652

UNITED STATES PATENT OFFICE 2,501,652

METHOD OF AND APPARATUS FOR STUFFING OIL FILTER ELEMENTS

Lloyd T. Barrickman, Eau Claire, Wis., assignor to Hutchens Industries, Eau Claire, Wis., a corporation of Wisconsin Application March 27, 1946, Serial No. 657,543

8 Claims. (Cl. 226—27)

This invention relates to a method of and apparatus for stuffing the filtering medium into a filter element.

In a filter which operates on the principle of passing the fluid to be filtered through a fibrous or flocculent material which allows the fluid to pass through while entrapping and retaining foreign matter, it is necessary to determine by performance tests the amount of material that gives optimum filtering efficiency for each size of filter. When this amount has been determined, a control system must be employed in charging the filter elements to assure that the required amount is put into each element. If too much material is packed into the filter element, flow of the fluid to be filtered will be unduly restricted with attendant danger to the machinery being served, as for example in the case of a filter in the lubricating oil line to the bearings of a Diesel engine. If too little material is put in the filter, the action of the fluid in passing through will cause grooves or channels to be formed in the filtering material mass, thus permitting a large proportion of the fluid to pass through the element without having been filtered.

Heretofore it has been customary to manually tamp the filtering material down into the filter using a rod as a tamping means. By this method the amount of material used and its distribution in the element depended upon the strength and skill of the individual worker. Due to the variations inherent in this method each finished element differed from all others in filtering efficiency and thus no uniform standard of performance could be maintained.

In assembling filter elements commercially it is highly desirable for cost ascertainment purposes that a method be employed whereby a definite production rate can be achieved even though unskilled labor is used.

It is therefore an object of the present invention to provide an apparatus for stuffing filter elements that will distribute the filtering medium uniformly throughout the element.

It is another object of the present invention to provide an apparatus for uniformly stuffing filter elements that may be adapted for use in filling any filtering element which consists substantially of a cylindrical casing having a top and bottom cover and a center tube positioned between the covers and which employs a fibrous or flocculent material as the filtering medium.

It is a further object of this invention to provide an apparatus for uniformly stuffing filter elements that is simple in construction, low in cost, and effective in its operation.

Another and further object of this invention is to provide an apparatus for stuffing filters in an efficient manner that does not require a highly-skilled operator.

A still further object of this invention is to provide an apparatus for stuffing filtering elements that is compact in structure and is readily adapted to use in an assembly line or as an automatically controlled production unit.

It is another and still further object of this invention to provide a method of stuffing filters which will produce an efficient, uniform product at a definite production rate and which will readily lend itself to a considerable amount of automatic operation.

It is thought that the above-mentioned method can best be explained by a description of the apparatus of my invention.

Other objects and advantages of this invention will more fully appear from the following detailed description taken in connection with the following drawings, in which:

Figure 1 is a fragmentary vertical sectional view taken through one of my stuffers, showing the apparatus in its initial operating position;

Figure 2 is a similar fragmentary vertical sectional view, showing the apparatus at the end of the stuffing operation;

Figure 3 is a fragmentary sectional view taken substantially on line III—III of Figure 1, before the filtering medium is put in the cylinder;

Figure 4 is a fragmentary sectional view taken on line IV—IV of Figure 2;

Figure 5 is a side elevation, partially broken away and partially in section, of a filter element in its finished form;

Figure 6 is a front elevation showing a typical installation of the filter stuffing apparatus in a battery of three units illustrating various phases of the stuffing operation; and Figure 7 is an enlarged fragmentary view in section of the portion of the lower ram shown broken away in Figure 1.

As shown on the drawings:

In Figure 2 reference numeral 10 indicates a partially assembled filter element. At this stage of the assembly operation, the element 10 consists of a cylindrical casing 11 covered at one end by a metal cap 12. Casing 11 is permanently positioned, as by peening or crimping, inside a cylindrical portion 13 of cap 12. At the center of cap 12 there is provided a downwardly projecting cylindrical boss 15 over which a center tube 16 is adapted to be positioned. The annular space thus formed between the cylindrical casing 11 and the center tube 16 and enclosed at one end by cap 12 is the space which is filled with filtering material in accordance with the method of stuffing filters set forth in this invention.

A number of holes 17 are provided in the casing 11 and a similar set of holes 18 is provided in center tube 16. These holes are designed to permit the entry and exit of the substance, either liquid or gas, which is to be filtered. The casing 11, the center tube 16, the top cap 12 and the bottom cap 12a (Figure 5), which is put on after the element has been filled, may suitably be made from light-gauge sheet metal.

As a repository for the filtering medium 20 prior to its injection into the filter element (Fig. 1), I have provided a loading cylinder 21 which is tightly fitted into a cylindrical recess in the base 22 and is secured therein by means of cap screws 23. The outside diameter of loading cylinder 21 is such that casing 11 of filter element 10 can be readily telescoped over the cylinder 21 after the filtering material has been put into the cylinder.

A center post 25 is positioned inside the loading cylinder 21 and is held concentric therewith by means of a guide plug 26 which has been pressed into the bottom of center post 25. The guide plug 26 is held down on base 22 by a capscrew 27. The base 22 in turn is rigidly secured to the table 28 by means of through bolts 29.

In order to support the filter element 10 in the position shown in Figure 1 a spacer tube 30 is inserted inside the center post 25, resting at its lower end on guide plug 26.

The filtering material 20 is pushed out of the loading cylinder 21 through the action of a ram 31 which is positioned for slidable reciprocating movement in the annular space between the wall of the packing cylinder 21 and the center tube 25. Means for actuating ram 31 is provided in the form of a pneumatic piston 32 which, acting through piston rod 33, forces a lower ram 34 upward. The lower ram 34 in turn, being connected to upper ram 31 by means of push-rods 35, causes the upper ram 31 to move upward and thus expel the filtering medium from the loading cylinder 21.

Push rods 35 are positioned in cylindrical holes in upper ram 31 and are held therein by capscrews 36. At their lower end push rods 35 have a threaded portion which is smaller in diameter than the push rod proper. A shoulder 38 (Fig. 7) is thus formed on each rod which abuts against the bottom of a cylindrical hole 39 in the lower ram 34. The threaded portion of each push rod 35 continues through a reduced section of the hole 39, and receives at its lower end a lockwasher 40 and a nut 37 for the purpose of holding the push rod 35 in place. Thus the upward push imparted to the lower ram 34 by piston rod 33 is transmitted to push rods 35 through the shoulder 38 and then to the upper ram 31 by the action of the upper end of the push rods on the bottom of the cylindrical holes in which their upper ends are positioned.

Lower ram 34 has a cylindrical shoulder 34a extending downward which acts as a stop for the piston mechanism as it is returned by gravity to its initial operating position after the stuffing operation is completed. The piston rod 33 is secured in the bottom of shoulder 34a, as by a screw thread. The lower end of piston rod 33 is secured to the pneumatic piston assembly 40 by means of a lockwasher 41 and a nut 42 as shown in Fig. 4. The piston 40 is made up of a disc 43 to which is secured a leather cup 44 of the conventional bicycle pump type.

A pneumatic cylinder 45 is provided which is comprised of a cylindrical chamber closed at the top and bottom, having a vent hole 46 at the top and a vent hole 47 in the side wall near the bottom. The piston 40 and the cylinder 45 are designed so that the piston may be mounted inside the cylinder for slidable reciprocating movement therein maintaining a close contact with the inside cylinder wall. The cylinder 45 is secured, as by welding, to a cylindrical base 56 which is secured to the floor by studs 57.

Air under pressure is introduced into the bottom of cylinder 45 by means of a pipe 48 which is connected to a pressure header 49. A quick-opening, spring-loaded valve 50 is connected in the air line to allow manual control of the flow of air under pressure to the pneumatic cylinder 45. A rod 52, connected at its lower end to the seating member of the valve, has a hook at its upper end. A cable 53 is connected to this hook and extends upward through an opening 54 in the work table 28. When the operator pulls up on this cable 53 the valve 50 is opened and air is admitted to the pneumatic cylinder 45. When the cable is released a spring in the valve will return the seating member to its seat and stop the flow of air.

My invention is put into use in the following manner. The spacer tube 30, suitably adapted to be used with the particular size of filter element to be filled, is inserted in the center post 25. It is to be noted that a range of filter elements of different lengths may be accommodated on this apparatus simply by changing the length of the spacer tube 30 on which the filter element rests in its initial position. A quantity of filtering material, conforming to the optimum amount of material for best filtering performance, is weighted out and distributed around the center post 25 in the loading cylinder 21. The center tube 6 is put in place in the center post 25. The filter element, which at this stage of the loading operation comprises a casing 11 secured to a cap 12, is telescoped over the loading cylinder 21, and at the same time the center tube 16 is positioned over the cylindrical boss 15 of the cap 12. The apparatus is now ready for the loading operation.

As the operator pulls up on the air valve cable 53 by means of the noose 55 on the upper side of the work table 28, thus opening the valve and sending air under pressure to the pneumatic cylinder, he exerts a downward pressure with his other hand on the top of the filter element 10. As the upper ram 31, through the action of the pneumatic piston 32 and the intermediate push rods, forces the filtering material 20 upward into the filter element, the pressure of the operator's hand is overcome and the filter element is loaded and brought to a position, as illustrated in Figure 2, just clear of the apparatus.

It is to be noted that, as the filtering material enters the filter element, it contacts and adheres to the perforated surface of the center tube 16 thus lifting the center tube up with the rest of the filter element. If a center tube is used which has a smooth surface a tighter fit between the inside of the center tube and boss 15 of the cap 12 must be employed.

It is also to be noted that the tendency of the filtering material to penetrate and grip the holes in the perforated surfaces of the center tube and inside wall of the element will retain the material in the element even when all support is removed from underneath as when the filled element is taken off the apparatus.

When filter elements are stuffed using the method and apparatus of my invention, a uniform, efficient product results due to the following facts: the optimum amount of filtering material as determined by filtering tests is measured out and used in filling each element, one continuous injection stroke is employed, the pressure actuating the pneumatic piston is constant at the beginning of each injection stroke, and the whole operation does not depend on the skill of the operator.

In Figure 5 is shown a typical filter element after the bottom cap 12a has been secured in position.

In Figure 6 is illustrated a typical installation of this apparatus showing a battery of three units. In this drawing is indicated also the three stages of the operating procedure. The unit at the left shows the apparatus before any operation has been performed. The unit in the middle illustrates the apparatus after the filter element has been put in place over the loading cylinder. The unit at the right shows the unit at the end of the operation.

Since each unit is small and compact, it may readily be employed in a production unit wherein all the operations of weighing the filtering material, distributing it in the loading chamber, positioning the empty element in telescoping relation to the chamber, restraining the element in position during the loading operation and removing the loaded element are done automatically.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a machine for stuffing filter elements having perforated center tubes and walls, a chamber for holding the filtering medium, a center post in said chamber for supporting the filter element in telescoping relation with said chamber, means for forcing the filtering medium into said filter element for penetrating contact with the perforated walls thereof.

2. In a machine for stuffing filter elements, a cylindrical chamber, a center tube in said chamber, a ram mounted for reciprocating movement in said chamber around said center tube, a lower ram mounted outside of said chamber, push rods connecting the lower ram with the upper ram, a cylinder, a fluid-operated piston mounted in said cylinder and operative on said lower ram, and a valve for regulating the flow of fluid to said cylinder.

3. In a method of stuffing a filter element or the like including a sleeve capped at one end, the steps of weighing a predetermined amount of filler consistent with the size of said element and the character of the matter to be filtered, placing said weighed material into a confining chamber, telescoping said element with relation to said chamber with the capped end in spaced relation from the top of said chamber, pressing on the capped end of said element and pushing the material in said chamber under pressure into said held element.

4. In a method of manufacturing a filter element comprising a sleeve capped at one end and a perforated center tube, the steps of weighing a predetermined amount of filler consistent with the size of said element and the character of the matter to be filtered, placing said weighed material into a confining chamber, telescoping said element with relation to said chamber with the capped end in spaced relation to said chamber, pressing on the capped end of said element, pushing the material in said chamber into said held element, removing the filled element, and enclosing the free end of said element by placing a cap thereon.

5. A machine for stuffing a filter element shell having a center tube comprising a chamber for holding a predetermined quantity of filtering material, a hollow center post disposed in said chamber, a spaced member in said center post for receiving and holding at a predetermined height the center tube of an inverted filter element shell with the outer wall of the shell in telescoping relation with the wall of said chamber and means for forcing the filtering medium into said filtering element shell.

6. A machine for stuffing a filter element shell having a center tube comprising a chamber for holding a predetermined quantity of filtering material, a hollow center post disposed in said chamber, a removable spacer member in said center post for receiving and holding at a predetermined height the center tube of an inverted filter element shell with the outer wall of the shell in telescoping relation with the wall of said chamber and a ram mounted for reciprocating movement in said chamber around said center tube for forcing the filtering medium into said filtering element shell.

7. A machine for stuffing a filter element shell having a center tube comprising a chamber for holding a predetermined quantity of filtering material, a hollow center post disposed in said chamber, a spacer member in said center post for receiving and holding at a predetermined height the center tube of an inverted filter element shell with the outer wall of the shell in telescoping relation with the wall of said chamber, a ram mounted for reciprocating movement in said chamber, a lower ram mounted outside of said chamber, push rods connecting the lower ram with the upper ram, and means operative on said lower ram to move said upper ram for forcing filtering material into said filtering element shell.

8. A machine for stuffing a filter element shell having a center tube comprising a chamber for holding a predetermined quantity of filtering material, a hollow center post disposed in said chamber, a spacer member in said center post for receiving and holding at a predetermined height the center tube of an inverted filter element shell with the outer wall of the shell in telescoping relation with the wall of said chamber, and means for forcing the filtering medium into said filtering element shell, the walls of said hollow center post and said hollow chamber being relatively thin so that the filtering medium will grip said element shell and center post immediately upon leaving said chamber to move the shell upwardly off the chamber as it is compacted in the shell.

LLOYD T. BARRICKMAN.

REFERENCES CITED

The following references are of record in the file of this patent:

UNITED STATES PATENTS

| Number | Name | Date |
|---|---|---|
| 380,185 | Chase | Mar. 27, 1888 |
| 1,241,226 | Lang | Sept. 25, 1917 |
| 1,757,370 | Kilian | May 6, 1930 |
| 2,279,953 | Richey | Apr. 14, 1942 |
| 2,314,640 | Winslow et al. | Mar. 23, 1943 |
| 2,379,230 | Griffin | June 26, 1945 |
| 2,410,015 | Cook | Oct. 29, 1946 |

FOREIGN PATENTS

| Number | Country | Date |
|---|---|---|
| 490,973 | Great Britain | Aug. 24, 1938 |